Jan. 23, 1968  R. E. HORAN, JR  3,365,064
SWIMMING POOL SYSTEM AND BACKWASH ASSEMBLY THEREFOR
Filed Oct. 14, 1965  2 Sheets-Sheet 1

INVENTOR
RAYMOND E. HORAN, JR.
BY
WARREN, BROSLER, CYPHER & ANGLIM
ATTORNEYS

United States Patent Office 3,365,064
Patented Jan. 23, 1968

3,365,064
SWIMMING POOL SYSTEM AND BACKWASH ASSEMBLY THEREFOR
Raymond E. Horan, Jr., El Cerrito, Calif., assignor to Jacuzzi Bros., Incorporated, a corporation of California
Filed Oct. 14, 1965, Ser. No. 496,084
4 Claims. (Cl. 210—169)

ABSTRACT OF THE DISCLOSURE

A swimming pool system having a backwash filter in the suction line of the pool pump, and a multiple valve in the system adapted to control the backwash flow to the main filter and direct such backwash flow to the backwash filter, the backwash filter being convertible to function as a hair and lint remover during normal filtering operations, as well as a slurry pot to recharge the main filter when of the diatomaceous type.

My invention relates to swimming pool systems and the like and more particularly to the filtering of the water in such systems.

Swimming pool systems basically involve a pool having a drain discharge connected to the intake of a pump by a suction line connecting the two, and a discharge line flow connecting the output of the pump to the pool. The suction line usually includes a hair and lint remover for trapping such matter in addition to other debris flowing to the pump through the suction line. The discharge line conventionally includes a main filter for filtering dirt and sediment from the water being delivered to the pool from the pump.

To periodically clean the filter, it is subjected to a backwash operation under control of a multiple valve, which upon actuation, will block off the discharge line to the pool, while causing the pump discharge to flow through the filter in reverse direction, to free the filter of trapped sediment and cause the same to be discharged, usually to waste with the backwash water.

More recently, attempts have been made to clean such discharge from the main filter by passing it through an auxiliary or backwash filter, and returning the water to the system, whereby such water will not be lost.

The present invention relates to improvements in a system utilizing such auxiliary or backwash filter, and has for its objects, (1) To provide a novel and improved swimming pool system involving such backwash facilities, (2) To provide a novel and improved swimming pool system having a backwash filter and wherein such backwash filter may be converted for use as a hair and lint remover during normal filtering operations, or as a slurry pot in recharging the main filter when such main filter is of the diatomaceous earth type, (3) To provide a novel and improved swimming pool system having improved backwash facilities for the main filter.

(4) To provide a novel and improved filter backwash assembly for use in a swimming pool or like system, (5) To provide a noval and improved filter backwash assembly which incorporates a backwash filter for use in backwash operations, and (6) To provide a novel and improved filter backwash assembly for use in a swimming pool system, which assembly includes a backwash filter adaptable for conversion to use as a hair and lint remover during normal filtering operations.

Figure 1:
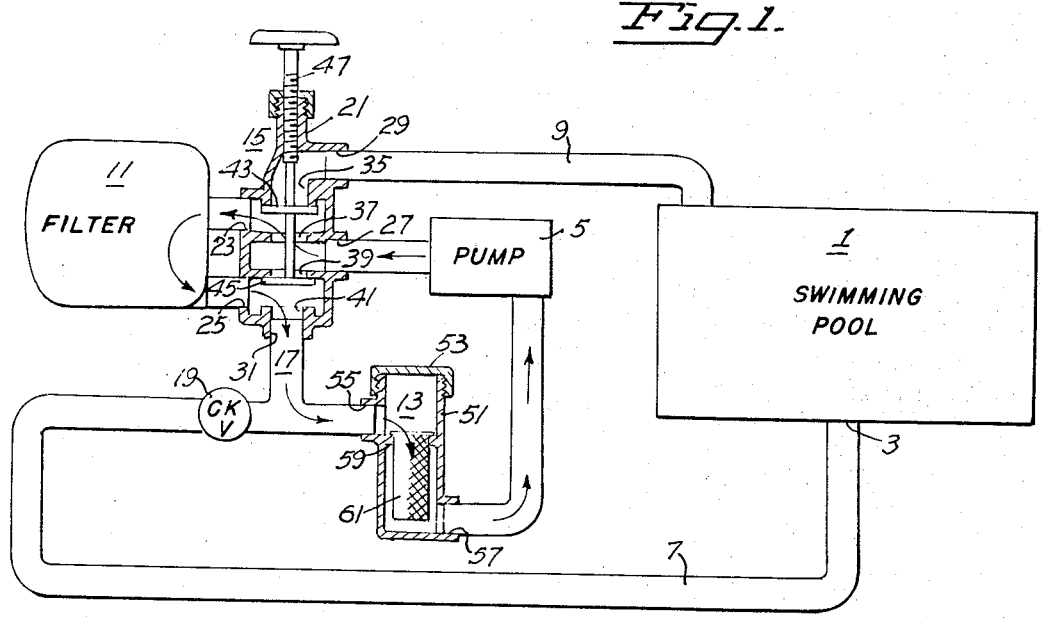
Figure 2:
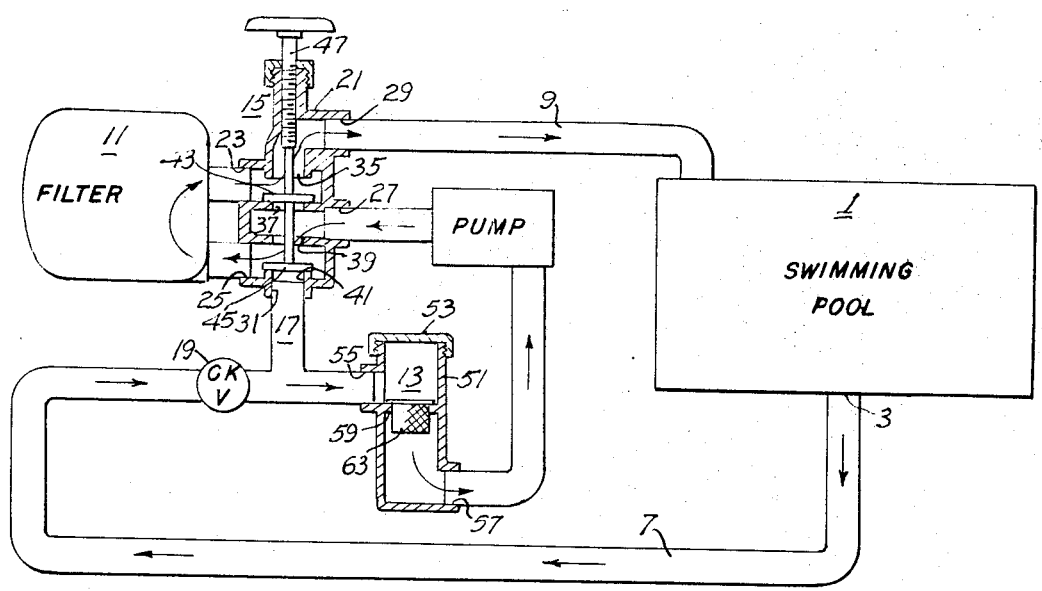
Figure 3:
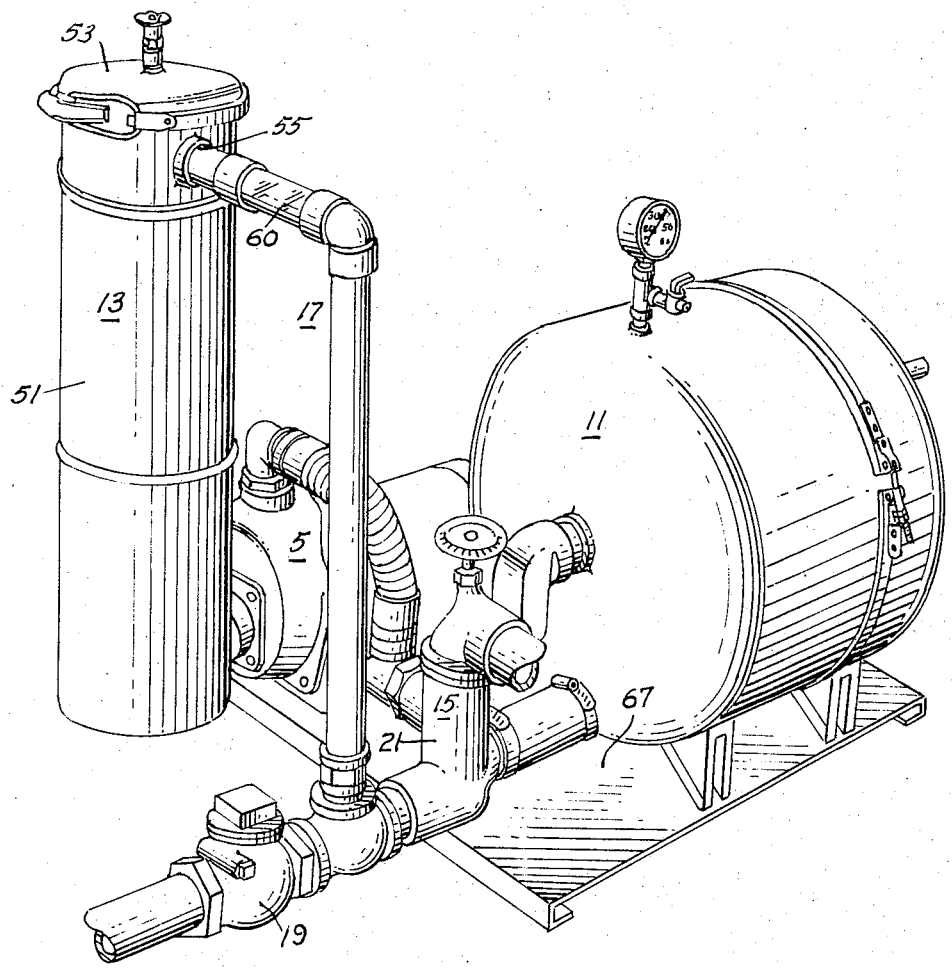

Additional objects of my invention will be brought out in the following description of a preferred embodiment of the same, taken in conjunction with the accompanying drawings wherein:

FIGURE 1 is a schematic diagram of a swimming pool system embodying the present invention, showing the same in condition for backwashing of the main filter, FIGURE 2 is a similar view to FIGURE 1, but illustrating the system adjusted for normal filtering operations, and FIGURE 3 is a 3-dimensional view of a filter backwash assembly of the present invention, employable in the system of FIGURES 1 and 2.

Referring to the drawings for details of my invention in its preferred form, the same applies to a swimming pool system which basically comprises a swimming pool 1 having a drain discharge 3 connected to a pump 5 through a suction line 7 from the drain discharge to the intake of the pump, and a discharge flow line 9 connecting the output of the pump to the pool, the discharge line including a main filter 11. The pump in receiving the discharge from the pool, forces it back to the swimming pool through the filter, thus continually maintaining a supply of clean water to the pool.

The main filter is generally one of two conventional types, either a filter of the sand and gravel type, where the water is filtered through a bed of sand, or a filter of the diatomaceous earth type, wherein diatomaceous earth in the form of a coating on a number of filter elements in the filter, functions to filter out the dirt or sediment in water flowing through the filter. Such coatings may be formed by flowing diatomaceous earth into the filter with water, the water passing through the filter elements while the diatomaceous earth is deposited as a coating on the surfaces thereof.

Both types of filters may be cleaned by flowing water in reverse through the filter, and this is known as a backwash operation.

In carrying out the present invention to perform such backwash operation without loss of water in the system, I provide a backwash filter 13 in the suction line to the pump, and in conjunction with a multiple valve assembly 15 for blocking off the pump discharge line to the pool, while reversing flow through the main filter, I further provide means 17 for coupling the reversed flow output of the main filter to the backwash filter. This results in the establishment of a closed flow circuit including the pump, the main filter and the backwash filter, to the exclusion of the rest of the system, and to assure no contamination of the pool water by backwash water, a check valve 19 is placed in the suction line, upstream of the closed flow circuit.

The multiple valve assembly 15 for blocking off the pump discharge line to the pool while reversing the flow through the main filter, is a four-way two-position valve assembly comprising a housing 21 having a pair of openings 23, 25 for connection thereto of the main filter, an opening 27 for connection of the pump, an opening 29 for discharge of filtered liquid to the swimming pool, and a discharge opening 31 for outflow of water from the main filter during a backwash operation.

One of the openings 23 to the main filter is located in the housing intermediate the pump connection opening 27 and the discharge opening 29 to the pool, and is flow connectable with such openings through opposing valve openings 35, 37 while the other filter opening 25 is located intermediate the pump connection opening 27 and the outflow opening 31 for backwash water, and is flow connectable with both through opposing valve openings 39, 41. A pair of valve elements 43, 45 mounted on a common valve stem 47, with one element 43 disposed between the first pair of valve openings 35 and 37, and the other between the second pair of valve openings 39 and 41, will in one position, establish normal operation of the swimming pool system, while in its other position, will block off the pump discharge line to the pool, while reversing flow through the main filter.

In this latter position, sediment carried out from the main filter will be trapped in the backwash filter, thus resulting in a cleaning of the main filter without loss of water, as the same water will circulate in the closed flow circuit comprising the pump, main filter and backwash filter. Following such operation, the filter element may be removed from the backwash filter, and discarded if of the disposable type, or cleaned if of the more permanent cleanable type. If the main filter is of the sand and gravel type, it will then be ready for use, while if of the diatomaceous earth type, it will be in condition for recharging with diatomaceous earth.

The location of the backwash filter in the system of the present invention is such that it could not only be adapted to function as a slurry pot for recharging the main filter when of the diatomaceous earth type, but it could also be employed to replace and perform the function of the conventionally employed hair and lint remover.

The backwash filter accordingly is in the form of a container 51 provided with a removable cover 53 and having an intake opening 55 adjacent its upper end, and a discharge opening 57 adjacent the bottom thereof. Internally of the container and intermediate these openings, is a ledge or flange 59 to support a removable filter element 61 which may take the form of a bag of filter cloth, filter paper, or a plastic filtering material such as Vygon.

With the filter element removed from the backwash filter, the container may be employed as a slurry pot to receive diatomaceous earth with which to recharge the main filter, if of the diatomaceous earth type. Such recharging may be effected by positioning the valve assembly for a backwash operation and setting the pump into operation.

For converting the backwash filter to function as a hair and lint remover, one merely substitutes a strainer basket 63 for the filter element, and adjusts the valve for normal swimming pool operation of the system.

The closed flow circuit components may be coupled together as a unit assembly ready for connection into a swimming pool system. One manner of accomplishing this, is illustrated in FIGURE 3 of the drawings, wherein the pump 5 and main filter 11 are mounted on a common platform 67 with the backwash filter and multiple valve assembly coupled thereto in proper functional relationship by piping including the flow coupling means 17, and supported by such piping. In the flow coupling means, which connects the reverse flow output of the main filter to the backwash filter, I provide means for indicating to an operator, the condition of the liquid flowing in the closed flow circuit during a backwash operation, and such may take the form of a sight glass 60 which will enable one to determine, by the clarity of the water flowing therethrough, the prevailing condition of the main filter and when one might terminate the backwash operation.

The term "multiple valve" as used is to be construed to include functionally equivalent separate valves, and the term "drain discharge" includes discharge whether from the bottom of the pool as illustrated, or by way of skimmers or the like which are also connected to pump suction.

From the foregoing description of my invention in its preferred form, it will be apparent that the same is subject to alteration and modification without departing from the underlying principles involved, and I accordingly do not desire to be limited in my protection to the specific details illustrated and described except as may be necessitated by the appended claims.

I claim:
1. A swimming pool or like system comprising
a pool having a drain discharge,
a pump,
a suction line flow connecting said pool at said drain discharge to the intake of said pump,
a discharge line flow connecting the output of said pump to said pool, said discharge line including a main filter,
and means for backwashing said filter without loss of water in said system, said means including a backwash filter in said suction line, a multiple valve assembly including a portion of said pump discharge line and having means for blocking off said pump discharge line to the pool while reversing flow through said main filter to an independent port, and flow coupling means connecting the reversed flow output of said main filter from said independent port to said backwash filter, to establish a closed flow circuit including said pump, said main filter and said backwash filter,
said backwash filter having removable filter means to enable converting said backwash filter for use as a hair and lint remover during normal filtering operations of said system.

2. A system in accordance with claim 1, characterized by said main filter being of the diatomaceous earth type, whereby said backwash filter may also constitute a slurry pot to recharge said main filter.

3. A filter backwash assembly for a swimming pool system or the like comprising
a platform,
a pump mounted on said platform,
a suction line connected to the intake of said pump,
a discharge line from the output of said pump, said discharge line including a main filter, said filter being mounted on said platform,
and means for backwashing said filter without loss of water in such system, said means including a backwash filter in said suction line, a multiple valve assembly including a portion of said pump discharge line and having means adapted to block off said pump discharge line while reversing flow through said main filter to an independent port, and flow coupling means connecting the reversed flow of said main filter from said independent port to said backwash filter, to establish a closed flow circuit including said pump, said main filter and said backwash filter,
said backwash filter having removable filter means to enable converting said backwash filter for use as a hair and lint remover during normal filtering operations of such system.

4. A filter backwash assembly in accordance with claim 3, characterized by said main filter being of the diatomaceous earth type, whereby said backwash filter may also constitute a slurry pot to recharge said main filter.

References Cited

UNITED STATES PATENTS

| | | | |
|---|---|---|---|
| 2,388,668 | 11/1945 | Carter | 210—93 |
| 3,252,575 | 5/1966 | Jacuzzi | 210—169 X |
| 3,253,431 | 5/1966 | Minhinnett | 210—411 X |

SAMIH N. ZAHARNA, *Primary Examiner.*